United States Patent
Manani et al.

(10) Patent No.: US 7,034,546 B2
(45) Date of Patent: Apr. 25, 2006

(54) METHOD AND APPARATUS FOR MEASURING INSERTION LOSS OF A CONDUCTOR

(75) Inventors: Mansukh C. Manani, Singapore (SG); Harshang Pandya, Singapore (SG)

(73) Assignee: Agilent Technologies, Inc., Palo Alto, CA (US)

( * ) Notice: Subject to any disclaimer, the term of this patent is extended or adjusted under 35 U.S.C. 154(b) by 18 days.

(21) Appl. No.: 10/856,598

(22) Filed: May 28, 2004

(65) Prior Publication Data

US 2005/0264299 A1    Dec. 1, 2005

(51) Int. Cl.
*G01R 31/02*    (2006.01)
*G01R 27/04*    (2006.01)

(52) U.S. Cl. .................... 324/539; 324/641

(58) Field of Classification Search ........... 324/539, 324/538, 537, 500, 520, 521, 527, 616, 66, 324/76.11, 76.12, 637–644, 158.1; 379/23, 379/24, 1.01, 399.01; 702/108, 182, 57
See application file for complete search history.

(56) References Cited

U.S. PATENT DOCUMENTS

| | | | |
|---|---|---|---|
| 5,497,099 A * | 3/1996 | Walton | 324/641 |
| 6,459,478 B1 * | 10/2002 | Schmidt et al. | 356/73.1 |
| 6,819,936 B1 * | 11/2004 | Weissman | 455/522 |
| 6,873,827 B1 * | 3/2005 | Wright | 343/703 |
| 6,894,504 B1 * | 5/2005 | Faulkner | 324/539 |
| 6,950,779 B1 * | 9/2005 | Minatani | 702/182 |

* cited by examiner

Primary Examiner—Vincent Q. Nguyen
Assistant Examiner—Hoai-An D. Nguyen (57) ABSTRACT

A method and apparatus for determining the insertion loss of a conductor. The method includes introducing a test signal into a first signal transmission path and a second signal transmission path. The conductor is included in the first path but at least partially excluded from the second path. The method includes measuring the strength of the test signal from the two paths and obtaining the insertion loss of the conductor from the two measured values.

20 Claims, 3 Drawing Sheets

METHOD AND APPARATUS FOR MEASURING INSERTION LOSS OF A CONDUCTOR

BACKGROUND

This invention relates in general to cable testing, and more particularly to the measurement of insertion loss or attenuation characteristics of a conductor, such as a twisted pair.

It is increasingly common for computers, workstations, printers and file servers in a modern office to be interconnected to form a local area network (LAN). These devices on the LAN are typically physically connected using twisted-pair LAN cables. An example of a twisted-pair LAN cable is an eight-wire cable which is configured as four twisted-wire pairs. These twisted-wire pairs are commonly referred to simply as "twisted pairs". The twisted pairs are enclosed within a flexible wrapper that may include an electrostatic shield. Each end of the LAN cable is terminated in an industry-standard connector, such as an RJ-45 connector. A LAN cable that is poorly installed, or has faulty twisted-pairs or connectors can result in errors in data transmission therethrough. Therefore, during installation, the LAN cable is typically tested to verify that its parameters are within specifications before it is commissioned for use.

One of these parameters is the attenuation or insertion loss of the LAN cable for a signal having a frequency in a given frequency range. The measured insertion loss is compared with a specified insertion loss limit which indicates the maximum signal loss allowable in a given LAN cable. Attenuation of a signal when propagating through a LAN cable may be simply the result of the decrease in the power of the signal as it propagates along the cable, or the result of signal loss through a faulty twisted pair or connector. If the attenuation exceeds the specified limit, the LAN cable is considered not to be compliant with the performance specifications and will have to be replaced.

A known method of measuring insertion loss in or of a LAN cable is by use of a test instrument that includes a main (or master) unit and a remote (or slave) unit connected to a first end and a second end of the cable under test respectively. The main unit is operable to apply a swept-frequency sine wave signal at the first end of a twisted-pair of the cable. The strength of the signal is measured using the remote unit at the second end of the cable. The frequency of the signal is incremented in discrete steps across the range of frequencies. At each frequency, a signal strength measurement is taken to determine the attenuation of the test signal by the twisted-pair at the frequency. In this manner, a list of attenuation values of the twisted pair is generated. This list of attenuation values is compared with a corresponding list of worst-case attenuation values that is obtained from an attenuation versus frequency characteristic curve specified for the cable under test. Such a comparison is to determine compliance, that is, whether or not the attenuation limit according to the specification is exceeded. It is thus important to ensure that the insertion loss measurements are accurately determined.

The attenuation of the test signal (at a particular frequency) along a path that includes a transmitter TXm of the main unit, a twisted-pair and a receiver RXr of the remote unit may be represented as follows:

$$\text{Input}-\text{Output}=L_{TXm}(t2)+L_{RXr}(t2)+L_{Section1}+L_{Section2}+L_{Cable} \quad (1)$$

wherein

Input is the desired signal strength of the test signal to be transmitted by the transmitter TXm;

Output is the signal strength of the test signal measured by the receiver RXr at time t2;

$L_{TXm}(t2)$ is the change in signal strength of the test signal attributable to the transmitter TXm at t2;

$L_{RXr}(t2)$ is the change in signal strength of the test signal attributable to the receiver RXr at t2;

$L_{Section1}$ and $L_{Section2}$ are the insertion losses attributable to sections of the path in the main unit and remote unit respectively; and $L_{Cable}$ is the insertion loss of the twisted-pair of the cable under test.

In order to determine $L_{Cable}$, the same measurement is performed for a corresponding twisted-pair of a calibration cable having a known insertion loss. The attenuation of the test signal along a similar path may be represented as follows:

$$\text{Input}-\text{Output}_{Cable\_calib}=L_{TXm}(t1)+L_{RXr}(t1)+L_{Section1}+L_{Section2}+L_{Cable\_calib} \quad (2)$$

wherein $\text{Output}_{Cable\_calib}$ is the measured signal strength of the test signal received by the receiver RXr at a time t1;

$L_{TXm}(t1)$ is the change in signal strength of the test signal due to the transmitter TXm at t1;

$L_{RXr}(t1)$ is the change in signal strength of the test signal due to the receiver RXr at t1; and $L_{Cable\_calib}$ is the insertion loss of the twisted-pair of the calibration cable.

The insertion loss, $L_{Cable}$, of the twisted pair of the cable under test may be determined by combining equations (1) and (2) as follows:

$$\text{Output}-\text{Output}_{Cable\_calib}=L_{TXm}(t1)-L_{TXm}(t2)+L_{RXr}(t1)-L_{RXr}(t2)+L_{Cable\_calib}-L_{Cable} \quad (3)$$

The above equation (3) may be rewritten as follows:

$$\text{Output}-\text{Output}_{Cable\_calib}=\Delta L_{TXm}+\Delta L_{RXr}+L_{Cable\_calib}-L_{Cable}$$

$$L_{Cable}=\Delta L_{TXm}+\Delta L_{RXr}+L_{Cablecalib}-\text{Output}+\text{Output}_{Cable\_calib} \quad (4)$$

wherein $\Delta L_{TXm}$ is the difference in test signal strength change attributable to the transmitter TXm at time t1 and t2; and $\Delta L_{RXr}$ is the difference in test signal strength change attributable to the receiver RXr at time t1 and t2.

From equation (4), it can be seen that the insertion loss of the cable is affected by any difference in test signal strength change attributable to the transmitter TXm and the receiver RXr at the time the calibration is carried out, t1, and the time of measurement of the twisted-pair of the cable under test, t2. For the insertion loss of the cable to be accurate, $\Delta L_{TXm}$ and $\Delta L_{RXr}$ should ideally be zero. Unfortunately, such is not the case. The transmitter TXm and the receiver RXr include active components whose operating characteristics are temperature dependent. Thus, if the two measurements are carried out when the temperature of the test instrument is changing, such as during a warming-up period, $\Delta L_{TXm}$ and $\Delta L_{RXr}$ will have non-zero values depending on the difference in temperature at time t1 and t2. These temperature dependent non-zero values cause the insertion loss at each signal frequency to vary or drift to result in discrepancies in the insertion loss measurement. Consequently, the insertion loss measurement may not be accurate or repeatable.

A twisted pair, which rightfully is marginally within the specified limit according to a LAN cabling standard, such as the ISO/IEC, the TIA/EIA, the Cenelac LAN cabling standards, may thus be deemed to exceed the specified limit because of the contributions of $\Delta L_{TXm}$ and $\Delta L_{RXr}$.

One way of obtaining the insertion loss of a cable under test that is less dependent on temperature of the test instrument is to perform calibration of the test instrument only after the temperature of the test instrument has stabilized. Alternatively, calibration may be performed immediately before each measurement when the test instrument is used during the warming-up period of the test instrument. However, since the temperature may take as long as half an hour or more to stabilize within the test instrument, such solutions are not very practical.

SUMMARY

The invention may be implemented as a rapid, efficient method for accurately determining the insertion loss of a conductor using a test apparatus that does not require a lengthy warm-up. A test signal is introduced at least substantially simultaneously into a pair of signal transmission paths, a first path of which includes the conductor and a second path in which the conductor is at least partially excluded. The strength of the test signal is measured on each path, and the insertion loss of the conductor is obtained from the two measured values.

An apparatus for determining the insertion loss of a conductor includes a signal source for providing a test signal at least substantially simultaneously into two signal transmission paths, one of which includes the conductor and the other in which the conductor is at least partially excluded. The apparatus also includes at least one measuring device for measuring the signal strength from the two paths and a processor that calculates the insertion loss of the conductor from at least the two measured values.

BRIEF DESCRIPTION OF DRAWINGS

The invention will be better understood with reference to the drawings, in which.

DETAILED DESCRIPTION OF THE EMBODIMENTS

As shown in the drawings for purposes of illustration, the invention is embodied in a novel method of measuring the insertion loss of a conductor, such as a twisted pair. The insertion loss of a conductor is also referred to as the amount of attenuation of a signal propagating through the conductor. Existing methods have suffered from lack of accuracy, efficiency, or convenience, or have required excessive warm-up or preparation times.

Figure 1:
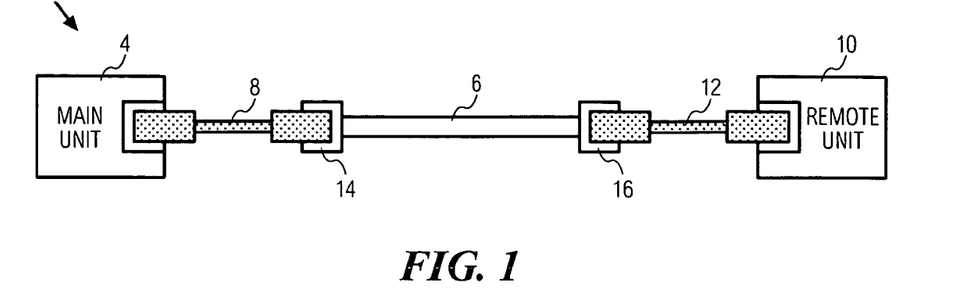
FIG. 1 is a schematic drawing of a representative test setup for measuring the insertion loss of a conductor, such as a twisted-pair in a LAN cable, wherein a main unit of a test apparatus is connected to one end of the cable using a patch cable and a remote unit of the test instrument is connected to the other end of the cable using another patch cable.

Referring to FIG. 1, a test set up 2 generally for carrying out the invention includes a main (or master) unit 4 from which a signal is provided to a conductor 6 under test, a first patch cable 8 for coupling the main unit 4 to the conductor 6 under test, a remote unit 10 in which the signal is received from the conductor 6 under test, and a second patch cable 12 for coupling the remote unit 10 to the conductor 6 under test. The two ends of the conductor 6 under test may be coupled to their respective patch cables 8, 12 via connectors 14, 16, such as RJ-45 connectors. The insertion loss due to these patch cables 8, 12 may or may not be included in the insertion loss measurement of the conductor 6 under test depending on the mode of testing as specified in the relevant standards for the conductor 6. For ease of description, the patch cables 8, 12 are hereafter considered, not separately, but as part of the conductor 6 under test as shown in FIG. 2.

Figure 2:
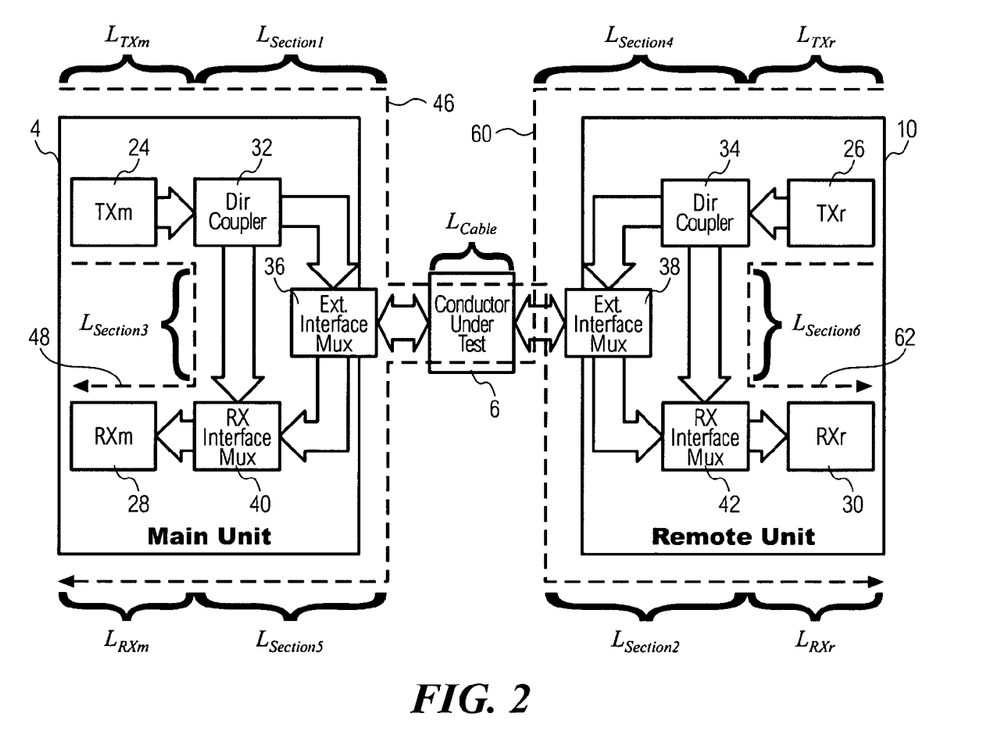
FIG. 2 is a schematic drawing similar to that in FIG. 1 showing a generic test setup wherein the cable under test may or may not include the patch cables in FIG. 1, the drawing further showing components of the main and remote units, and signal transmission paths through which test signals, generated using the main and remote units in FIG. 1 propagate.

FIG. 2 shows the components of the main unit 4 and the remote unit 10. The main unit 4 and the remote unit 10 include respective signal sources, such as transmitters TXm 24, TXr 26, measuring devices, such as receivers RXm 28, RXr 30, directional coupler transformers 32, 34, external interface multiplexers 36, 38, receiver input multiplexers 40, 42, processors (not shown) and other components (not shown) known to those skilled in the art. These other components may for example include an input means, such as a keyboard for entering commands to operate the main unit 4 and the remote unit 10, and an output means, such as a display for displaying measurement results.

Each transmitter 24, 26, under the control of the respective processor, is able to transmit a test signal, such as a sinusoidal signal, at a selected frequency. An output of the transmitter 24, 26 is connected to an input of the respective directional coupler transformer 32, 34. The directional coupler transformer 32, 34 derives a buffered reference test signal from the test signal. This buffered reference test signal is made available at a first output of the directional coupler transformer 32, 34. The directional coupler transformer 32, 34 also serves to buffer the test signal. A buffered test signal is made available at a second output of the directional coupler transformer 32, 34. The first output of the directional coupler transformer 32, 34 is connected to a first input of the respective receiver input multiplexer 40, 42. The second output of the directional coupler transformer 32, 34 is connected to an input of the respective external interface multiplexer 36, 38.

Each external interface multiplexer 36, 38 has a respective input/output port that is configurable either as an input port or an output port. The main unit 4 and the remote unit 10 are connected to the conductor 6 via these input/output ports of the external interface multiplexers 36, 38. When configured as an output port, the buffered test signal received at the input of the respective external interface multiplexer 36, 38 is made available at the input/output port of that external interface multiplexer 36, 38 for transmission through the conductor 6. When configured as an input port, a signal received at the input/output port of the external interface multiplexers 36, 38 is made available at an output of the external interface multiplexers 36, 38. This output of the external interface multiplexers 36, 38 is connected to a second input of the respective receiver input multiplexer 40, 42. Each receiver 28, 30 is connected to an output of the respective receiver input multiplexers 40, 42. The receiver 28, 30 may thus receive the reference test signal from the respective directional coupler transformer 32, 34 or the signal received at the input/output port of the respective external interface multiplexer 36, 38 by configuration of the respective receiver input multiplexer 40, 42 and the respective external interface multiplexer 36, 38 accordingly.

Each transmitter 24, 26 includes active electronic components, such as an analog-to-digital converter (ADC) and/or a digital-to-analog converter (DAC), a frequency sweep generator, an up converter, an RF amplifier etc (all of which are not shown). Most, if not all of these components, are sensitive to a change in temperature. In other words, the characteristics of these components change with a change in temperature. Similarly, each receiver 28, 30 includes active electronic components, such as an RF amplifier, a down converter, a frequency discriminator, an ADC and/or a DAC etc, (all not shown) which are also sensitive to a change in temperature. As mentioned above, these temperature sensitive components affect the accuracy and thus the repeatability of insertion loss measurement. The characteristics of the transmitters 24, 26 and receivers 28, 30 also change with age of their components. The directional coupling transformers 32, 34, the receiver input multiplexers 40, 42 and the external interface multiplexers 36, 38 of the main unit 4 and the remote unit 10 are considered to include devices or components that are less sensitive to temperature changes as compared to the transmitters 24, 26 and the receivers 28, 30.

Figure 3:
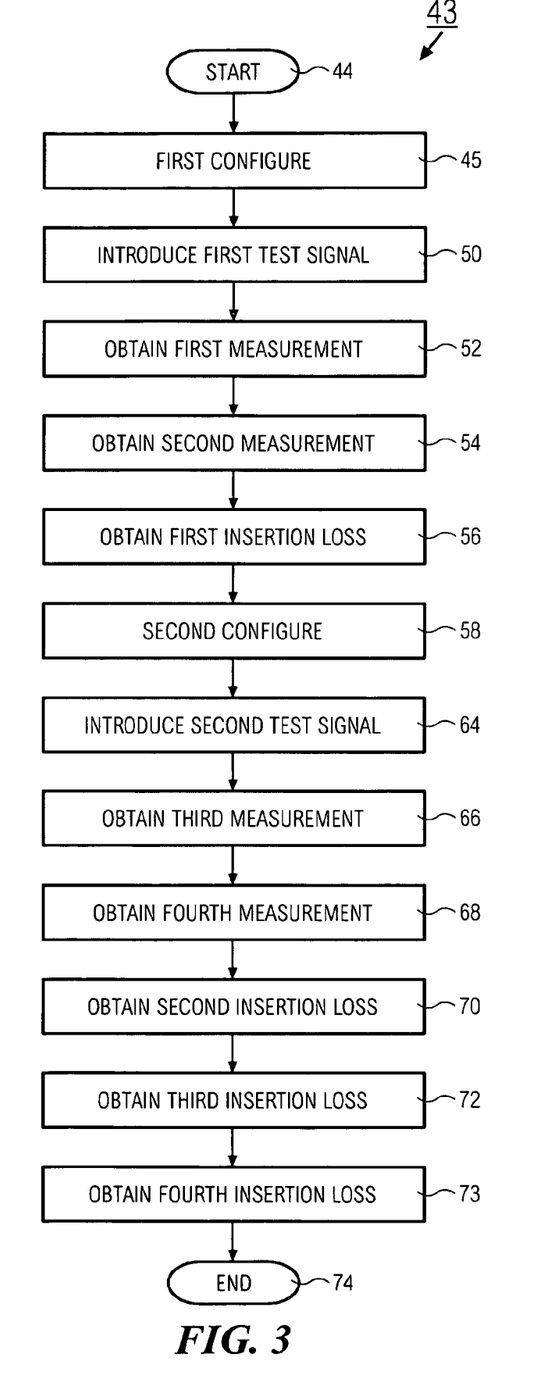
FIG. 3 is a flowchart showing a method, according to an embodiment of the invention, for measuring the insertion loss of a conductor using the test setup in FIG. 2.

Referring now to FIG. 3, a method 43 generally for determining the insertion loss of a conductor, using the setup in FIG. 2, includes introducing 50 a test signal at least substantially simultaneously into a first signal transmission path 46 (FIG. 2) and a second signal transmission path 48 (FIG. 2), wherein the first path 46 includes the conductor 6 under test and wherein the conductor 6 under test is at least partially excluded from the second path 48. The method further includes measuring 52 the strength of the test signal from the first path 46 to obtain a first measured value; measuring 54 the strength of the test signal from the second path 48 to obtain a second measured value and obtaining 56 the insertion loss of the conductor 6 from the two measured values.

More specifically, according to the embodiment shown in FIG. 3, the method begins 44 with connecting the main unit 4 and the remote unit 10 to the conductor 6 in accordance with the test setup shown in FIG. 2, for measuring the insertion loss of the conductor 6. The method includes initially configuring 45 the main unit 4 as a transmitting unit and the remote unit 10 as a receiving unit. The processor of the main unit 4 configures the input/output port of its external interface multiplexer 36 as an output port. The processor of the main unit 4 also configures its receiver input multiplexer 40 to connect the first output of the directional coupler transformer 32 to the receiver RXm 28. The input/output port of the external interface multiplexer 38 of the remote unit 10 is configured as an input port for receiving a test signal transmitted through the conductor 6. The receiver input multiplexer 42 of the remote unit 10 is also configured to connect the output of the external interface multiplexer 38 to the receiver RXr 30 of the remote unit 10.

With such a configuration, the transmitter TXm 24 of the main unit 4 defines a common first end of a first signal transmission path 46 and a second signal transmission path 48 as shown in FIG. 2. The first path 46 terminates at the receiver RXr 30 of the remote unit 10 and the second path 48 terminates in the receiver RXm 28 of the main unit 4. The conductor 6 is included in the first path 46 but completely excluded from the second path 48 in this configuration.

The method further includes, as mentioned earlier, introducing 50 a first test signal of a signal strength, Input1, into the conductor 6 under test. The first test signal is generated using the transmitter TXm 24. This first test signal first propagates to the directional coupler transformer 32 to be split thereat into a first reference test signal and a first buffered test signal. The first reference test signal propagates through a section of the second path 48 to the receiver input multiplexer 40 while the first buffered test signal propagates through a section of the first path 46 to the external interface multiplexer 36. The first buffered test signal further propagates through the external interface multiplexer 36, the conductor 6 connected thereto to reach the remote unit 10. In the remote unit 10, the first buffered test signal further propagates through the external interface multiplexer 38 and the receiver input multiplexer 42 to reach the receiver RXr 30.

The receiver RXr 30 of the remote unit 10 measures 52 and records the signal strength of the first test signal received by the receiver RXr 30, i.e. at the second end of the first path 46. This first measured signal strength of the first test signal, more specifically the first buffered test signal, received by the receiver RXr 30 may be represented by the following equation:

$$\text{Input1}-\text{Output1}=L_{TXm}+L_{RXr}+L_{Section1}+L_{Section2}+L_{Cable} \quad (5)$$

wherein

Input1 is the signal strength of the test signal;

Output1 is the first measured signal strength of the first test signal received by the receiver RXr 30;

$L_{TXm}$ is the signal strength change attributable to the transmitter TXm 24;

$L_{RXr}$ is the signal strength change attributable to the receiver RXr 30;

$L_{Cable}$ is the insertion loss of the conductor; and $L_{Section1}+L_{Section2}$ are the insertion losses in other sections of the first path 46 as shown in FIG. 2.

The signal strength change in the transmitter TXm 24 and the receiver RXr 30 may include a change in signal strength due to amplification or attenuation of the test signal propagating therethrough. The first measured signal strength value, Output1, is transmitted by the remote unit 10 via the conductor 6 to the main unit 4 for subsequent processing thereat. If the conductor 6 is a twisted-pair of a LAN cable, the first measured signal strength value may be transmitted to the main unit 4 using any one of the twisted-pairs.

While the first buffered test signal propagates along the first path 46, the first reference test signal from the directional coupler transformer 32 propagates through the receiver input multiplexer 40 in the second path 48 to reach the receiver RXm 28 of the main unit 4. In other words in this embodiment, the first test signal propagates simultaneously through the first path 46 and the second path 48. However, the first test signal may be two separately generated signals that propagate at least substantially simultaneously through the two paths 46, 48. Substantially simultaneously is defined herein as any period of time that is substantially shorter than the time required to disconnect the main unit 4 and the remote unit 10 from the conductor 6 under test and connecting them to a calibration conductor (not shown), a process which typically requires at least tens of seconds to carry out. In this context, substantially simultaneously may thus be construed to include up to several seconds long. The receiver RXm 28 measures 54 and records the signal strength of the first test signal received, i.e. at the second end of the second path 48. The measured signal strength of the first test signal, more specifically the first reference test signal, received by the receiver RXm 28 may be represented by the following equation:

$$\text{Output2} = \text{Input1} + L_{TXm} + L_{RXm} + L_{Section3} \quad (6)$$

wherein

Input1 is the signal strength of the first test signal;

Output2 is the second measured signal strength of the first test signal received by the receiver RXm 28;

$L_{TXm}$ is the signal strength change attributable to the transmitter TXm 24;

$L_{RXm}$ is the signal strength change attributable to the receiver RXm 28; and $L_{Section3}$ is the insertion losses in a section of the second path 48 as shown in FIG. 3.

The time that elapsed between these two measurements is short, possibly less than a second. The processor in the main unit 4 obtains 56 the insertion loss of the conductor 6 from the two measured signal strength values. Specifically, the insertion loss of the conductor 6 is obtained from a difference in the two measured signal strength values to remove the signal strength change, $L_{TXm}$, attributable to the transmitter TXm 24. The difference in signal strength values is represented by the following equation:

$$\text{Output2} - \text{Output1} = L_{Cable} + L_{RXr} - L_{RXm} + L_{Section1} + L_{Section2} - L_{Section3} \quad (7)$$

It can be seen from equation (7) that the difference between the first and the second measured signal strength values provides the insertion loss of the conductor 6, $L_{Cable}$, that also includes signal strength changes due to the receivers RXm and RXr 28, 30 of the main unit 4 and the remote unit 10 respectively, and extraneous insertion losses in sections of the first path 46 and the second path 48 outside of the conductor 6. However, the insertion loss of the conductor is advantageously independent of signal strength change due to the transmitter TXm 24.

According to the embodiment, the method further includes configuring 58 the main unit 4 as a receiving unit and the remote unit 10 as a transmitting unit. The processor of the main unit 4 configures the input/output port of the external interface multiplexer 36 of the main unit 4 as an input port for receiving a test signal that is transmitted through the conductor 6 from the remote unit 10. The processor of the main unit 4 also configures the receiver input multiplexer 40 to connect the output of the external interface multiplexer 36 to the receiver RXm 28. The remote unit 10 may automatically configure itself after receiving the first test signal from the main unit 4 and transmitting the measured signal strength value of the test signal to the main unit 4. Alternatively, the remote unit 10 may wait for the main unit 4 to transmit a specific configuration instruction thereto before it configures itself to function as a transmitting unit. Specifically during configuration, the processor in the remote unit 10 configures the input/output port of the external interface multiplexer 38 as an output port for generating a second test signal. The receiver input multiplexer 42 of the remote unit 10 is also configured to connect the output of the directional coupler transformer 34 to the receiver RXr 30.

With such a configuration, the transmitter TXr 26 of the remote unit 10 is located at a common first end of a third signal transmission path 60 and a fourth signal transmission path 62 as shown in FIG. 3. The third path 60 terminates at the receiver RXm 28 of the main unit 4 and the fourth path 62 terminates in the receiver RXr 30 of the remote unit 10. The conductor 6 is included in the third path 60 but completely excluded from the fourth path 62.

Next, the processor of the remote unit 10 directs the transmitter TXr 26 to introduce 64, by generating, a second test signal of a signal strength, Input2, into the common first end of the third path 60 and the fourth path 62. The signal strength, Input2, of the second test signal is at least substantially equal to as the signal strength, Input1, of the first test signal.

The second test signal propagates from the transmitter TXr 26 to the directional coupler transformer 34 to be split thereat into a second reference test signal and a second buffered test signal. The second reference test signal propagates to the receiver input multiplexer 42 while the second buffered test signal propagates through a section of the third path 60 to the external interface multiplexer 38. In other words, the second test signal propagates simultaneously through the third and the fourth paths 60, 62. Similarly, the second test signal may be two separately generated signals that propagate only at least substantially simultaneously through the third and fourth paths 60, 62. The buffered test signal propagates through the external interface multiplexer 38 and the conductor 6 to reach the main unit 4. In the main unit 4, the second buffered test signal propagates through the external interface multiplexer 36 and the receiver input multiplexer 40 of the main unit 4 to reach the receiver RXm 28.

The receiver RXm 28 of the main unit 4 measures 66 and records the signal strength of the second test signal received, i.e. at the second end of the third path 60. This third measured signal strength of the second test signal, more specifically the second buffered test signal, received by the receiver RXm 28 may be represented by the following equation:

$$\text{Input2} - \text{Output3} = L_{TXr} + L_{RXm} + L_{Section4} + L_{Section5} + L_{Cable} \quad (8)$$

wherein

Input2 is the signal strength of the second test signal;

Output3 is the third measured signal strength of the second test signal received by the receiver RXm 28;

$L_{TXr}$ is the signal strength change attributable to the transmitter TXr 26;

$L_{RXm}$ is the signal strength change attributable to the receiver RXm 28;

$L_{Cable}$ is the insertion loss of the conductor under test; and $L_{Section4} + L_{Section5}$ are the insertion losses in other sections of the third path 60 as shown in FIG. 3.

The second reference test signal from the directional coupler transformer 34 propagates through the receiver input multiplexer 42 to reach the receiver RXr 30 of the remote unit 10. The receiver RXr 30 measures 68 and records the signal strength of the second test signal received, i.e. at the second end of the fourth path 62. The measured signal strength of the second test signal, more specifically the second reference test signal, received by the receiver RXr 30 may be represented by the following equation:

$$\text{Input2} - \text{Output4} = L_{TXr} + L_{RXr} + L_{Section6} \quad (9)$$

wherein

Input2 is the signal strength of the second test signal;

Output4 is the fourth measured signal strength of the second test signal received by the receiver RXr 30;

$L_{TXr}$ is the signal strength change attributable to the transmitter TXr 26;

$L_{RXr}$ is the signal strength change attributable to the receiver RXr 30; and $L_{Section6}$ is the insertion loss in a section of the fourth path 62 as shown in FIG. 2.

The signal strength change attributable to the transmitter TXr 26 and the receiver RXr 30 may include a change due to amplification or attenuation of the second test signal. The fourth measured signal strength value, Output4, is transmitted by the remote unit 10 via the conductor 6 to the main unit 4 for subsequent processing thereat. The time that elapsed between the third and fourth measurements, and the first and second measurements is short, for example less than several seconds. This period of time is negligible as compared to the time that elapsed between calibration and measurement in the prior art method which may be half an hour or longer according to manufacturer's recommendation.

The processor in the main unit 4 obtains 70 another insertion loss value of the conductor 6 from the third and fourth measured signal strength values. Specifically, this insertion loss value is obtained from a difference in the third and fourth measured signal strength values to remove the signal strength change, $L_{TXr}$, attributable to the transmitter TXr 26. The difference in signal strength values is represented by the following equation:

$$\text{Output4}-\text{Output3}=L_{Cable}+L_{RXm}-L_{RXr}+L_{Section4}+L_{Section5}-L_{Section6} \qquad (10)$$

It can be seen from equation (10) that the difference in the third and the fourth measured signal strength values provides the insertion loss of the conductor 6 $L_{Cable}$, that also includes signal strength changes due to the receivers RXm and RXr 28, 30 of the main unit 4 and the remote unit 10 respectively, and extraneous insertion losses in sections of the third path 60 and the fourth path 62 outside of the conductor 6. However, the insertion loss of the conductor 6 is advantageously independent of signal strength change due to the transmitter TXr 26.

The main unit further obtains 72 a more accurate insertion loss of the conductor 6, which is also independent of signal strength change due to the receivers RXm and RXr 28, 30, from the four measured values. Specifically, the main unit 4 combines the two difference values in equations (7) and (10) to obtain a composite measured value that is given by following equation:

$$(\text{Output2}-\text{Output1})+(\text{Output4}-\text{Output3})=2L_{Cable}+L_{Section1}+L_{Section2}-L_{Section3}+L_{Section4}+L_{Section5}-L_{Section6}$$

which may be simplified as follows:

$$\text{Composite\_Output}= 2L_{Cable} + L_{Constant} \qquad (11)$$

$$L_{Cable} = \frac{\text{Composite\_Output}- L_{Constant}}{2}$$

wherein $$\text{Composite\_Output}=(\text{Output2}-\text{Output1})+(\text{Output4}-\text{Output3})$$

$$L_{Constant}=L_{Section1}+L_{Section2}-L_{Section3}+L_{Section4}+L_{Section5}-L_{Section6}$$

As can be seen from the above equation (11), the sum of the two difference values in equations (7) and (10) that is now at least substantially independent of signal strength change due to the transmitters TXm and TXr 24, 26 and the receivers RXm and RXr 28, 30. This insertion loss nevertheless still includes extraneous insertion losses due to sections of the first, second, third and fourth paths 46, 48, 60, 62, outside of the conductor 6. However, these extraneous insertion losses are attributable mostly to components in the main and remote units 4, 10 that are not as adversely affected by temperature changes as the active components of the transmitters TXm and TXr 24, 26 and the receivers RXm and RXr 28, 30. The insertion losses due to these components thus remain relatively constant for a particular signal frequency.

To obtain a more accurate insertion loss of the conductor 6, the remaining unknown term in equation (11), $L_{Constant}$, should be eliminated. To obtain $L_{Constant}$, the above-described measurements are performed on a calibration conductor with a known insertion loss, $L_{Calib\_Cable}$.

The corresponding insertion loss equation for this calibration conductor is given by:

$$\text{Composite\_Output}_{Calib\_Cable}=2L_{Calib\_Cable}+L_{Constant}$$

$$L_{Constant}=\text{Composite\_Output}_{Calib\_Cable}-2L_{Calib\_Cable} \qquad (12)$$

From the above equation (12), $L_{Constant}$ can be determined since it is the only unknown term in the equation. The value of the $L_{Constant}$ is recorded in the main unit 4 and/or the remote unit 10. The main unit 4 next obtains 73 a more accurate insertion loss of the conductor 6 under test by subtracting the value of $L_{Constant}$ from the insertion loss obtained from the four measured values. The method ends 74 with the determination of this insertion loss.

It should be noted that $L_{Constant}$, like the insertion loss of the conductor 6, is frequency dependent. That is for the determination of insertion loss of a conductor 6 at each frequency specified in the relevant standards, an $L_{Constant}$ at that frequency will have to be determined using the calibration conductor and stored in a non-volatile memory (not shown) of the main unit 4. Since $L_{Constant}$ is not temperature dependent, such a calibration may be performed only once as part of a factory calibration process and the calibration process to obtain $L_{Constant}$ may be performed at any time, including just after power up of the main unit 4 and the remote unit 10. The calibration may be subsequently repeated, for example, once every year if it is found that aging of the components causes the value of $L_{Constant}$ to change.

It should also be noted that the strength of the signal received by the receivers RXm and RXr 28, 30 over the various signal transmission paths should be within a specified range. To ensure that this is the case for each measurement, each of the receivers RXm and RXr 28, 30 includes a circuit (not shown) connected thereto that allows a signal straight through, attenuate the signal or amplify the signal based on whether the signal strength is within, above or below the specified range, respectively. Such a compensation scheme is known to those in the art. The circuit relies on compensation data for attenuating or amplifying the received signal. The compensation data, which is obtained during factory calibration, is also independent of temperature changes and can therefore be used during the signal strength measurements.

Advantageously, the insertion loss of a conductor obtained using the above-described method is unlikely to include extraneous insertion losses and is thus accurate. Insertion loss measurements using a test apparatus employing the above-described method may be made at any time, regardless of temperature and thus does not require a long warm-up period. Unlike the prior art test instrument, daily calibration of the test instrument employing the above-described method is not necessary.

Accordingly, another embodiment of the invention includes an apparatus for determining the insertion loss of a conductor 6. The apparatus includes a signal source, such as the first transmitter TXm 24 for providing a first test signal into a first signal transmission path 46 and a second signal transmission path 48, wherein the first path 46 includes the conductor 6 and the conductor 6 is at least partially excluded from the second path 48. In some embodiments, the conductor 6 may be completely excluded from the second path 48. Also in some embodiments, the test signal has a selected frequency. The apparatus further includes at least one measuring device that measures the strength of the first test signal from the two paths 46, 48. In one embodiment, the at least one measuring device includes a first receiver RXr 30 that obtains the first measured signal strength value of the first test signal from the first signal transmission path 46 and a second receiver RXm 28 that obtains the second measured signal strength value of the first test signal from the second signal transmission path 48. The apparatus further includes a processor that calculates the insertion loss of the conductor 6 from at least the two measured values, such as from a difference in the two measured values.

As described above, to further remove the signal strength changes due to the receivers RXm and RXr 28, 30, the apparatus may further include a second transmitter TXr 26 for introducing a second test signal at least substantially simultaneously into a third signal transmission path and a fourth signal transmission path, wherein the third path includes the conductor and the conductor is at least partially, i.e. may also be completely, excluded from the fourth path. For those embodiments in which the first test signal is at the selected frequency, the second test signal is also set at the selected frequency. The second receiver RXm 28 is used to further obtain a third measured signal strength value of the second test signal from the third signal transmission path 60. The first receiver RXr 30 is used to further obtain a fourth measured signal strength value of the second test signal over the fourth signal transmission path 62.

The processor calculates the insertion loss of the conductor 6 from the four measured values, such as by adding a difference of the first measured value and the second measured value, and a difference of the third measured value and the fourth measured value.

The insertion loss of a calibration conductor, whose insertion loss is known, may be obtained in a similar manner so as to obtain the extraneous insertion losses due to sections of the first, second, third and fourth signal transmission paths 46, 48, 60, 62 outside of the calibration conductor. A sum of these extraneous insertion losses may be stored in the test apparatus and subsequently subtracted from the insertion loss of the conductor calculated from the four measured values as described above.

Although the invention is described as implemented in the above-described embodiments, it should not be construed to be limited as such. For example the present invention may be used for determining the insertion loss of other conductors, such as a coaxial cable whose ends are connected, for example, to respective BNC connectors.

According to an alternate embodiment, the first measured signal strength may be forwarded to the main unit 4 together with the fourth measured signal strength. Alternatively, the remote unit 10 may forward the difference between the first and the fourth measured signal strengths to the main unit 4 since the difference is a component of the Composite_Output in equation (11).

According to another embodiment, it may be necessary to remove only the dominant signal strength change due to a single transmitter 24, 26 or a single receiver 28, 30, for example, to reduce the length of time taken to complete the measurement.

To obtain an insertion loss of a conductor that is independent of signal strength change due to a single receiver, such as receiver RXr 30, a first test signal is generated using the first transmitter TXm 24 at a first end of the first path 46. This first path 46 includes the conductor. A second test signal, of at least substantially the same signal strength as the first test signal, is generated using the second transmitter TXr 26 that defines the fourth path 62 described above. Although the conductor is completely excluded from the fourth path 62, the conductor may be at least partially excluded from the fourth path 62 in some embodiments. In other words, the fourth path may at least partially include the conductor if the conductor can be tapped along its length for connecting the second transmitter TXr 26 thereto. The signal strength of the two test signals are measured at a common second end of the first path 46 and the fourth path 62 using the receiver RXr 30 thereat to obtain a first measured signal strength value and a second measured signal strength value respectively. The insertion loss is obtained from the two measured values, such as from a difference in the two measured values. This insertion loss is independent of signal strength change due to the receiver RXr 30.

Figure 4:
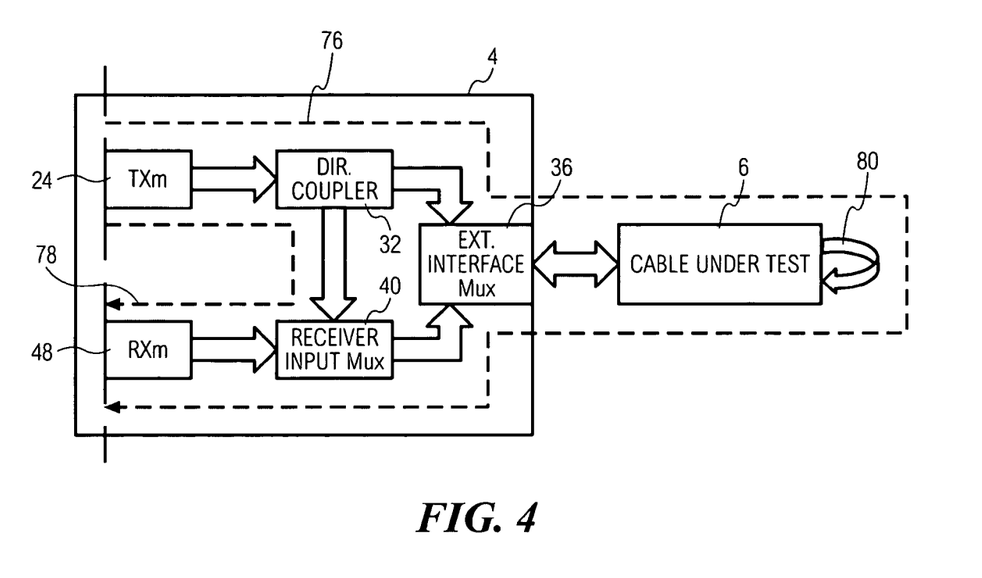
FIG. 4 is a schematic drawing of an alternative test setup wherein only one of the main unit and the remote unit is used for insertion loss measurement of a LAN cable.

According to yet another embodiment, the invention may be practiced using only a single unit, such as the main unit 4 having the transmitter TXm 24 and the receiver RXm 28 as shown in FIG. 4. During use, a test signal generated using the transmitter TXm 24 is applied at a common first end of a first path 76 and a second path 78. The first path 76 includes the conductor. The conductor is excluded from the second path 78. The signal strength of the test signal at a second end of the first path 76 is measured using the receiver RXm 28 connected thereto to obtain a first measured value. The signal strength of the test signal at a second end of the second path 78 is also measured using the receiver RXm 28 to obtain a second measured value. The insertion loss of the conductor is obtained from the two measured values. The insertion loss is independent of signal strength change due to both the transmitter TXm 24 and the receiver RXm 28.

The above-described test instrument may be used to determine the insertion loss of one of four twisted-pairs of an installed LAN cable, wherein the two ends of the LAN cable are some distance apart as shown in FIG. 4. When used in this manner, the test instrument is connected to the ends of two twisted-pairs at one end of the LAN conductor 6. The other ends of the two twisted-pairs at the other end of the LAN conductor are connected together using a loop-back connector or cable 80. With such an arrangement, the twisted-pair under test is one of at least two twisted-pairs of the conductor 6 and the first path includes both twisted-pairs connected in series.

It should be noted that each of the signal strength values in the above equations is measured according to a logarithmic scale and expressed in units of dB since it is more practical to measure attenuation using such a scale. Calculations involving logarithmic values require only simple addition and/or subtraction as illustrated in the equations. However, those skilled in the art would appreciate that the signal strength values may also be measured according to a linear scale and calculations involving such values require multiplication and/or division instead.

We claim:

1. A method for determining the insertion loss of a cable comprising a conductor, the method comprising:
    introducing a test signal at least substantially simultaneously into a first signal transmission path and a second signal transmission path, wherein the first path includes the conductor and wherein the conductor is at least partially excluded from the second path;
    measuring the strength of the test signal from the first path to obtain a first measured value;
    measuring the strength of the test signal from the second path to obtain a second measured value;
    obtaining the insertion toss of the conductor from the two measured values; and
    removing an extraneous insertion loss from the obtained insertion loss of the conductor, wherein the extraneous insertion loss is insertion loss attributable to a section of the first or second signal transmission oath outside of the cable.

2. A method according to claim 1, wherein obtaining the insertion loss of the conductor comprises obtaining the insertion loss of the conductor from a difference in the two measured values.

3. A method according to claim 1, wherein the conductor is a conductor of a twisted pair.

4. A method according to claim 1, wherein introducing a test signal comprises generating a test signal at a selected frequency using a single signal source.

5. A method according to claim 1, wherein measuring the strength of the test signal from the first path and from the second path comprises using a single measuring device to perform the measurements.

6. A method according to claim 1, wherein the conductor is completely excluded from the second path.

7. A method according to claim 6, wherein introducing a test signal comprises generating a test signal at a selected frequency using a single signal source.

8. A method according to claim 7, wherein measuring the strength of the test signal from the first path comprises using a first measuring device to perform the measurement and measuring the strength of the test signal from the second path comprises using a second measuring device to perform the measurement.

9. A method according to claim 8, further comprising:
    introducing a second test signal at least substantially simultaneously into a third signal transmission path and a fourth signal transmission path, wherein the third path includes the conductor and wherein the conductor is completely excluded from the fourth path;
    measuring the strength of the test signal from the third path using the second measuring device to obtain a third measured value;
    measuring the strength of the test signal from the fourth path using the first measuring device to obtain a fourth measured value;
    obtaining the insertion loss of the conductor from the four measured values.

10. A method according to claim 9, wherein obtaining the insertion loss of the conductor comprises obtaining the insertion loss of the conductor from a sum of a difference of the first measured value and the second measured value, and a difference of the third measured value and the fourth measured value.

11. A method according to claim 10 further comprising:
    obtaining the insertion loss of a calibration conductor, whose insertion loss is known, according to the manner for obtaining the insertion loss of the conductor to obtain extraneous insertion losses attributable to the signal transmission paths outside of the calibration conductor.

12. A method according to claim 7, wherein the first path further includes another conductor connected in series with the first conductor and wherein measuring the strength of the test signal from the first path and from the second path comprises using a single measuring device to perform the measurements.

13. A method according to claim 6, wherein introducing a test signal into a first signal transmission path and a second signal transmission path comprises:
    generating a first test signal at a selected frequency using a first signal source into the first signal transmission path;
    generating a second test signal at the selected frequency and of at least substantially the same signal strength as the first test signal using a second signal source into the second signal transmission path; and wherein
    measuring the strength of the test signals from the first path and the second path comprises using a single measuring device to obtain the first measured value and the second measured value respectively.

14. An apparatus for determining the insertion loss of a cable comprising a conductor comprising:
    a signal source for providing a test signal at least substantially simultaneously into a first signal transmission path and a second signal transmission path, wherein the first path includes the conductor and the conductor is at least partially excluded from the second path;
    at least one measuring device for obtaining a first and a second measured signal strength value of the test signal from the first and the second signal transmission path respectively; and
    a processor that calculates the insertion loss of the conductor from at least the two measured values and wherein the processor subtracts an extraneous insertion loss from the calculated insertion loss of the conductor, wherein the extraneous insertion loss is insertion loss attributable to a section of the first or second signal transmission oath outside of the cable.

15. An apparatus according to claim 14, wherein the processor obtains the insertion loss of the conductor from a difference in the two measured values.

16. An apparatus according to claim 14, wherein the conductor is completely excluded from the second path.

17. An apparatus according to claim 16, wherein the at least one measuring device comprises a first measuring device for obtaining the first measured signal strength value and a second measuring device for obtaining the second measured signal strength value.

18. An apparatus according to claim 17, further comprising:
    a second signal source for providing a second test signal at least substantially simultaneously into a third signal transmission path and a fourth signal transmission path, wherein the third path includes the conductor and the conductor is completely excluded from the fourth path; and wherein the second measuring device is for further obtaining a third measured signal strength value of the second test signal from the third signal transmission path;

the first measuring device is for further obtaining a fourth measured signal strength value of the second test signal from the fourth signal transmission path; and wherein the processor calculates the insertion loss of the conductor from the four measured values.

19. An apparatus according to claim 18, wherein the processor calculates the insertion loss by adding a difference of the first measured value and the second measured value, and a difference of the third measured value and the fourth measured value.

20. An apparatus according to claim 19, wherein the processor calculates the insertion loss of the conductor by subtracting, from the insertion loss of the conductor calculated from the four measured values, at least substantially extraneous insertion losses attributable to sections of the signal transmission paths outside of the conductor.

* * * * *